Aug. 9, 1949.  R. A. GAISER  2,478,817
METHOD OF FORMING SURFACE FILMS BY VAPOR COATING
AND THE ARTICLE RESULTING THEREFROM
Filed July 3, 1943
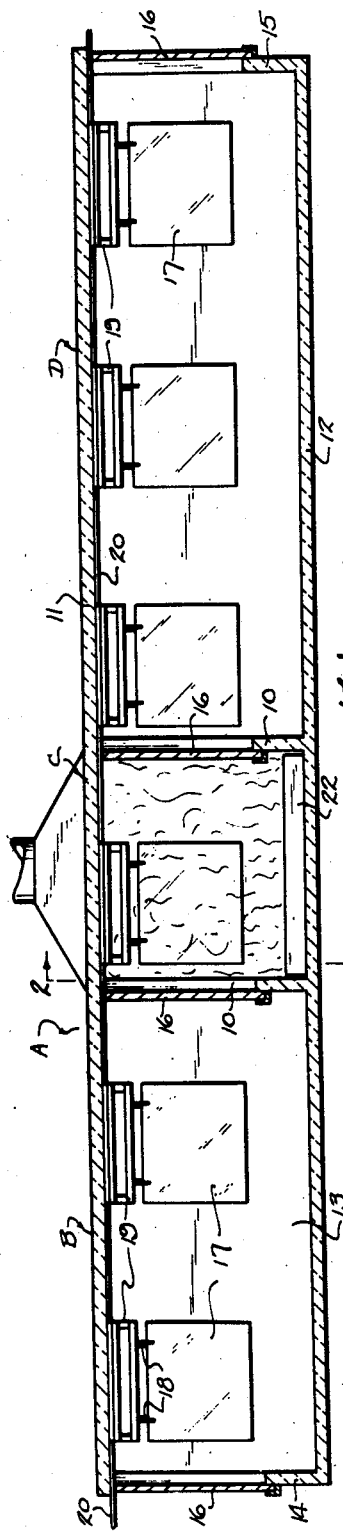
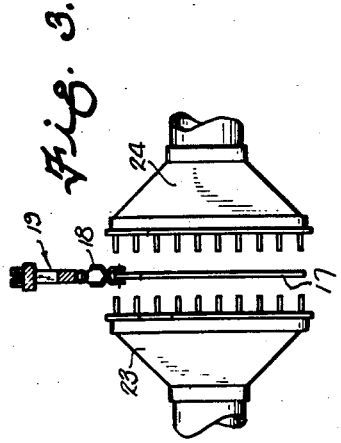
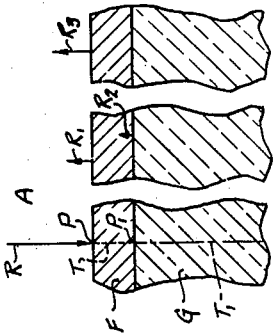
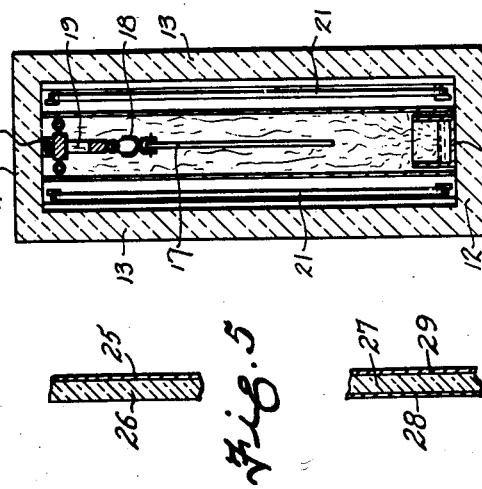
Inventor
ROMEY A. GAISER.
By Frank Fraser
Attorney Patented Aug. 9, 1949

2,478,817

UNITED STATES PATENT OFFICE 2,478,817

METHOD OF FORMING SURFACE FILMS BY VAPOR COATING AND THE ARTICLE RESULTING THEREFROM

Romey A. Gaiser, Toledo, Ohio, assignor to Libbey-Owens-Ford Glass Company, Toledo, Ohio, a corporation of Ohio Application July 3, 1943, Serial No. 493,358

15 Claims. (Cl. 88—105)

1

The present invention relates broadly to surface films or coatings. More particularly, it is concerned with a method for treating surfaces, to form films having high light reflecting and/or non-wettable characteristics, and with articles produced by practicing the method of the invention.

Essentially, films are produced in accordance with the invention by exposing a surface to be treated to the action of the vapors of a hydrolyzable, volatile chloride. By this method films can be formed on practically any material that will not be injured by the amount of heat required in filming, and on surfaces of all types and conditions. However, the high reflecting, non-wettable films, such as those produced by titanium tetrachloride, have so far found their greatest utility when applied to smooth, finished surfaces of relatively hard materials such as glass.

For example, when a sheet of glass is first heated and then brought into contact with titanium tetrachloride vapors for a short time, a very thin, colorless and transparent film, having a number of valuable properties, is formed on the exposed surfaces of the glass sheet. The film is quite stable, so far as any ordinary usage is concerned. It is high reflecting, and, in addition, is evenly wettable with water in the first instance, but non-wettable after washing and drying.

Because of these characteristics, such films are readily adaptable to a large number of uses. They can be applied to opaque glass to produce very desirable non-glare rear vision mirrors for automobiles. When formed on transparent glass surfaces, a transparent or one-way mirror results, and on transparent glass tableware, they serve to enhance both the beauty and utility of the pieces. Since the films can be uniformly wet with water, on the first application after filming, they are valuable as an intermediate coating in silvering, and, because of their subsequent non-wettability, they are useful on outside windows wherever clear vision is desirable, on structural glass for bath rooms, and in other places where moisture is excessive or objectionable.

Other objects and advantages of the invention will become more apparent during the course of the following description, when taken in connection with the accompanying drawings.

2

In the drawings, wherein like numerals are employed to designate like parts throughout the same:

Fig. 1 is a longitudinal sectional view through one form of apparatus for the continuous treatment of surfaces according to the invention;

Fig. 2 is a transverse sectional view taken substantially along the line 2—2 in Fig. 1;

Fig. 3 is a transverse sectional view through a cooling apparatus for use in tempering or case hardening glass plates or sheets after they have been filmed;

Fig. 4 is a diagrammatic view of a filmed glass sheet, showing the action of light rays at the film face and at the interface between the film and the glass;

Fig. 5 is a sectional view of one form of mirror produced in accordance with the invention; and Fig. 6 is a view similar to Fig. 5 but showing a modified form of mirror.

Referring now more particularly to the drawings, there has been illustrated in Fig. 1 a type of apparatus which may be employed in the filming of a large number of articles, and specifically glass sheets or plates, in a substantially continuous manner. As shown, the structure comprises a tunnel-like chamber designated in its entirety by the letter A and divided into a preheating section B, a filming section C and a baking or annealing section D by suitable partitions 10. The elongated chamber A is provided with top and bottom walls 11 and 12 respectively, side walls 13, and end walls 14 and 15. The end walls 14 and 15, and partitions 10, are preferably provided with sliding doors or curtains 16, which can be opened to permit the passage of the glass sheets therethrough but which are normally closed, to maintain the proper conditions within each of the sections B, C and D of the chamber A.

Glass sheets 17 to be treated are moved through the chamber A while supported, by means of tongs 18 or other suitable means, from carriages 19 running on slides 20, extending into and through the chamber A. Electric heating means 21 (Fig. 2) are provided throughout the length of the chamber A to permit the temperature of the glass sheets to be accurately controlled during preheating, filming and subsequent treatment. And a container 22 for the titanium tetrachloride or other volatile chloride, to be vaporized, is located near the floor of the section C.

When glass sheets that are cold or at room temperature are exposed to the vapors of titanium tetrachloride, a deposit results that is translucent, foggy, evenly wettable and may be somewhat crystalline, but which, after washing and drying, by vigorous rubbing with a towel, will become transparent and non-wettable. However, when the glass is heated, prior to exposure, a film that is immediately high reflecting, transparent, and colorless, as well as non-wettable after washing and drying, is deposited. For this reason, the glass sheets 17, after being suspended from the carriages 19, are preferably moved through the preheating section B to bring them to the desired temperature, before being filmed. This preheating temperature may range from 50 degrees centigrade to any point below the melting point of the glass although temperatures between 60 degrees and 400 degrees centigrade are preferred. In actual practice, except in cases where the glass sheets are to be heated to higher temperatures after filming, it has been found that preheating temperatures below 300 degrees centigrade do not produce sufficiently stable coatings for hard usage, and a temperature of approximately 350 degrees centigrade has been found to be the best for all around use and results.

A glass plate 17, having been brought to the desired temperature within the section B is then passed into the filming section C where it will be exposed to the vapors arising from the titanium tetrachloride in the container 22. It is not essential that the volatile, hydrolyzable chloride be heated in order to obtain a satisfactory film but it is desirable to do so in order to increase the amount of vapor present. To insure a uniform coating or film, it is preferred that the glass plate be kept in continuous motion while being filmed and the time required for filming ranges from 2 seconds to one or two minutes, being directly proportional to the temperature of the glass, the quantity of titanium tetrachloride vapor present, and the thickness of coating or degree of reflection desired.

As indicated above, it is important that the film or coating be as uniform as possible and this requires careful control, because of the rapidity with which the film is formed. For this reason, it is sometimes desirable to increase the filming time, in order to permit longer movement or manipulation of the glass sheet, which assists in improving uniformity of the coating. This extension of the filming time can be accomplished by diluting the titanium tetrachloride with other compounds which have a vapor pressure that is at least as high as the titanium tetrachloride and which produce vapors that do not act on the glass surface. One substance which has been satisfactorily used for this purpose is carbon tetrachloride, when mixed with the titanium tetrachloride in the ratio of 1000 parts of carbon tetrachloride to from 10 to 15 parts of the titanium tetrachloride. With this mixture, the filming time is increased from a few seconds to approximately one minute in securing a colorless film of high reflecting properties, and superior uniformity. Another diluent that has been used successfully is solid carbon dioxide, the $CO_2$ and $TiCl_4$ being kept separated by placing each in separate containers within the filming section.

After having been properly coated, the glass plates pass from the coating section C into and through the section D at which time they are slowly cooled, or further heated and then cooled, either rapidly or slowly, depending on the type of annealing treatment desired. In some instances, the coated sheets can be removed directly from the section C and permitted to cool in the open air.

As indicated above, in order to produce a highly stable coating, the glass must be heated to 300 degrees centigrade or over, either before or after filming. The results appear to be good regardless of whether the glass is preheated to the maximum temperature and then slowly cooled after being filmed, or whether it is only heated to a temperature of around 60 degrees centigrade beforehand and then baked at the maximum temperature immediately after filming.

Particularly good results from the standpoint of stability are obtained by tempering the filmed glass sheet. That is, by first heating the sheet to substantially its point of softening and then rapidly chilling it to place the outer surfaces under compression and the interior under tension. This can be done by heating the filmed sheet in the section D of the chamber A to the proper point and then cooling it by blasts or jets of air directed onto both sides of the sheet simultaneously from blower heads 23 and 24 such as are shown in Fig. 3. After pieces of glass, filmed with titanium tetrachloride vapors, are subjected to this treatment, the film is so stable and tightly adherent that it is impossible to remove it from the glass even by scraping with a razor blade.

It is believed that the film or coating formed on the glass by the methods just described is titanium dioxide, having a refractive index in the massive state of 2.5 to 2.9. It is known that titanium tetrachloride hydrolyzes to form titanium dioxide and hydrogen chloride according to the equation:

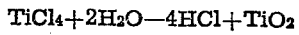

$$TiCl_4 + 2H_2O - 4HCl + TiO_2$$

Apparently, when a glass sheet is exposed to the vapors of titanium tetrachloride, this reaction occurs on the surface of the glass and results in the liberation of hydrogen chloride gas and the deposition of the titanium dioxide on the surface, as a film having a refractive index slightly below 2.5.

Glass plates provided with colorless films produced in this manner, when measured on the optical bench, show light reflection characteristics varying from 10% to 35% depending on the thickness of the film. With a reasonable amount of care, filmed glass sheets showing 70% transmission of light at normal incidence and 30% reflection of light at 45° incidence can be consistently produced by the above methods.

As the thickness of the film increases beyond a point where the reflection is 30% to 35%, colors are produced which are first golden, then purple, then blue. In other words, relatively thin films are colorless but, as the thickness increases beyond a definite point, the films appear to be of different colors depending on the thickness. It appears that the colors the due solely to film thickness, being caused by interference and reinforcement of various wave lengths of the spectrum. The relationship between the color and thickness of the films is of considerable value since the thickness of the films can be measured by their color, and vice versa, the color of the film can be varied by controlling its thickness.

In order to better understand the high reflecting characteristics of the film and just what takes place at the film surface, and also at the interface between the film and the glass, as well as to explain the color of the film, it will be helpful to consider Fresnel's theoretical light phenomenon as involved in this invention.

When light from one transparent medium passes into another transparent medium at normal incidence, which is sufficient to discuss for the present purpose, a fraction of the light is reflected into the medium from whence it came. This fraction is equal to $$\left(\frac{n_1-n_2}{n_1+n_2}\right)^2$$

of the impinging light where $n_1$ is the refractive index of the one medium and $n_2$ is the refractive index of the other medium.

Thus, for glass of index of refraction of 1.52 surrounded by an air medium, the per cent reflection from one glass surface would be $$\left(\frac{1.52-1}{1.52+1}\right)^2$$

or 4.25% of the impinging light.

However, if the glass is surfaced with a film of index of refraction of other than 1.52, the above phenomenon must be considered not only at the air-film interface, but also must be considered at the film-glass interface. This can be better understood by referring to Fig. 4 of the drawings which shows diagrammatically a body of glass G having a film of transparent material F thereon and surrounded by an air medium A.

For the sake of simplicity and to effectively diagram the superposition of rays along a path of normal incidence, the diagram of Fig. 4 has been segmented so that each part of a ray which is reflected at the separate interfaces may be shown individually rather than superimposed. R is a ray of light normally incident on the film surface at point P where a portion $R_1$ is reflected and a portion T is transmitted. The ray T is incident at the film-glass interface at the point $P_1$ where a portion $R_2$ is reflected and a portion $T_1$ is transmitted.

As a theoretical example, let the index of refraction of the air $A=1.00$, of the glass $G=1.52$, and of the film $F=2.22$. The reason 2.22 is chosen as the index of refraction of the film rather than 2.5 is because the index of a material in the film state is usually less than the index of the same material in the massive state.

Substituting these values in Fresnel's formula $$\left(\frac{2.22-1}{2.22+1}\right)$$

it is found that the amplitude of $R_1$ is .379. This amplitude is the square root of the reflection that would occur at the air surface if no film phenomenon was present. However, at the film-glass interface, Fresnel's formula must also be applied. Thus, the transmitted ray T whose intensity is only 85.6% of the original ray R, suffers a loss by reflection at the point $P_1$. The amplitude of this reflected ray is a fraction $$\left(\frac{2.22-1.52}{2.22+1.52}\right)$$

or .187, of the amplitude of the ray T. Therefore, the amplitude of ray $R_2$ is $$(.187)[\sqrt{1.00-(.379)^2}]$$

or .173.

Now, the question arises as to whether or not the amplitude of ray $R_2$ should be vectorially added to or subtracted from the amplitude of ray $R_1$. This question may be easily answered if it is understood (a) that ray $R_1$ by virtue of its reflection from a more dense optical medium has undergone a phase change of 180° while ray $R_2$ has suffered no change of phase, and (b) that the film thickness is important in computing the retardation of the ray $R_2$ behind the ray $R_1$.

Thus, if the film has an optical thickness of one-quarter wave length of monochromatic light $\lambda$, the ray $R_2$ will travel a total path through the film of one-half a wave length and will arrive at point P, one-half a wave length behind ray $R_1$, but due to the 180° reversal of phase of $R_1$, $R_2$ will reinforce $R_1$ and the amplitude will be vectorially additive, or $R_1+R_2=R_3$. By the same token, it may be seen that an optical film thickness of $\lambda/2$ of a monochromatic light will result in interference of that light.

Therefore, the amplitudes .379 and .173 in the above example, where the optical film thickness of F is $\lambda/4$, become additive, and as the reflection is the square of the amplitude, the reflection loss from one surface amounts to 30.4%.

For the purpose of simplicity, only first order reflections have been discussed in this example.

As already pointed out, the film of the invention is remarkably stable. When formed on glass sheets at a temperature of 300 degrees centigrade or higher, or when formed at lower temperatures, followed by a baking treatment above 300 degrees, the stability is such that a Bon Ami wash does not affect the film. Such filmed glass plates have been laminated with a plastic interlayer in the usual commercial manner without injury. Others have been subjected to strong soap and water washing four times a day for a period of twelve weeks. They have been exposed to alcohol, vinegar, carbonated water, and hydrant water for extended periods. They have been washed frequently with Bon Ami and polished vigorously with towels. None of these treatments have had the slightest effect on the appearance or high reflective qualities of the filmed glass. Accelerated weathering tests, over a number of complete cycles, and exposure to an ultra-violet arc for 856 hours (the equivalent to 856 days in June sunlight at Washington, D. C.) have also been carried out without any noticeable impairment of the coating. In fact, all tests indicate that the film is entirely suitable for everyday use and will withstand any normal cleaning operation.

In addition to the above, the effect of various chemical compounds on the titanium tetrachloride produced films was also tested. There was no noticeable effect when the coated glass was dipped for 24 hours in benzol, 28% ammonium hydroxide, 2% sodium carbonate, 95% denatured alcohol, acetone, glacial acetic acid, or 10% acetic acid. Exposure to concentrated sulfuric acid, 10% sulfuric acid, concentrated nitric acid, or nitric acid in a 1:1 dilution for 45-minute periods failed to affect the film. And $2_N$ sodium hydroxide or $.5_N$ sodium hydroxide failed to produce any effect in 30 minutes.

The high reflecting and other characteristics of the titanium dioxide film makes possible the production of any number of articles by the application of the film to different bodies. For example, when applied, as at 25 in Fig. 5, to the finished surface of a plate of black opaque glass 26, having a normal light reflection at 45° incidence of approximately 5%, it will be found that the treatment results in reflections of light up to 30%. This amount of reflection is similar to that found in galena or lead sulphide mirrors which are commonly used for rear vision mirrors in automobiles.

However, this filmed, black glass will be more satisfactory for the purpose than a galena mirror, because of its greater efficiency in polarizing light and the resultant reduction in glare and improvement in visibility, with approximately the same amount of reflection. Actual tests show that the polarization of light from a piece of black glass, treated with titanium tetrachloride vapors, is over twice that secured from a galena mirror. In addition, the action of the filmed black glass is that of a front surfaced mirror, while the galena mirror is essentially a back surfaced one. Results similar to those obtained with the black glass can be had by painting the back of a piece of clear glass 27, as at 28 in Fig. 6, to render it opaque, and then filming the front surface as indicated at 29.

An exceedingly interesting physical property of the films produced with titanium tetrachloride vapors is that they are evenly wet the first time water is applied, but are not wettable by water once they have been washed and dried. The fact that the films can be evenly wet in the first place makes them valuable in connection with the silvering of plastics, and it has been found that plastics, which are ordinarily difficult to silver, after being filmed in this manner, can be easily and completely silvered by the spray method.

The subsequent non-wettability of the film is also important. After it has been washed and dried, a drop of water can be made to roll around on a filmed surface without wetting the glass and the water in contact with the film exhibits cohesive properties that resemble a drop of mercury. Because of this quality, the coatings are valuable in making windshields, tableware, shower wall tiles, and, in fact, any article that is to be used where wettability by water is a non-desirable property of its surface.

It has already been mentioned that, because of the high light reflecting qualities of the film, when it is applied to a transparent glass plate a one-way or transparent mirror is provided. When this is used as an outer window or viewing panel, it serves a two-fold purpose since it permits vision from the inner, dark side only and will not be wet by rain or dampness.

The films are also highly decorative. When applied to transparent glass tableware, for example, the appearance of these articles is greatly enhanced. The glass is given a sparkling brilliance, and goblets take on a crystal-like appearance. The feature of non-wettability is also a definite asset in this connection from a utilitarian point of view, because the drying of the coated glass after washing is much more simple and requires less time since it is possible to practically shake the water off.

In addition to glass, the surfaces of a large number of other materials can also be treated in a similar manner. These include, besides transparent, colored, clear and opaque glass plates: tableware of various kinds; vitreous and other tiles; and methyl methacrylate resins, styrene, cellulose acetate, and polyvinyl butyral, plastics. In all cases satisfactory surface films are obtained.

Germanium tetrachloride as well as titanium tetrachloride has also been successfully used in filming surfaces by the method of the invention, and among other volatile chlorides that may be employed for the purpose are: vanadium tetrachloride, zirconium tetrachloride and stannic tetrachloride.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. The method of forming a transparent substantially colorless and non-wettable film on a glass surface, comprising heating said surface, exposing the heated surface to the vapors of titanium tetrachloride, discontinuing said exposure before a noticeable color appears on the filmed surface, and finally washing and drying the film.

2. The method of forming a transparent substantially colorless high reflecting film on a surface, comprising heating said surface to a temperature that does not exceed its softening point, passing the heated surface into a substantially closed chamber containing vapors of titanium tetrachloride to film the same, and removing the surface from said chamber before a noticeable color appears in the film.

3. The method of forming a uniformly thick transparent substantially colorless high reflecting film on a surface, comprising heating said surface to a temperature that does not exceed its softening point, exposing the heated surface to the vapors of a mixture of titanium tetrachloride diluted with a compound of at least equal vapor pressure that is inert to the glass surface and to the titanium tetrachloride while moving said heated surface through said vapors to film said surface, and discontinuing said exposure before a noticeable color appears in the film.

4. The method of forming a transparent substantially colorless high reflecting film on a surface, comprising heating said surface to a temperature between 50 degrees centigrade and the softening point of the surface, exposing the heated surface to the vapors of titanium tetrachloride to film the same, and discontinuing said exposure before a noticeable color appears in the film.

5. The method of forming a stable transparent substantially colorless high reflecting film on a surface, comprising heating said surface to a temperature between 300 degrees centigrade and the softening point of the surface, exposing the heated surface in an atmosphere saturated with the vapors of titanium tetrachloride to film the same, and discontinuing said exposure before a noticeable color appears in the film.

6. The method of forming a transparent substantially colorless high reflecting film on a surface, comprising preheating said surface to a temperature below its softening point, exposing the preheated surface to the vapors of titanium tetrachloride to film said surface, discontinuing said exposure before a noticeable color appears in the film, and then baking the filmed surface at a temperature in excess of 300 degrees centigrade.

7. The method of producing a tempered glass article having a transparent substantially colorless high reflecting film thereon, comprising preheating a glass article, exposing the preheated article to the vapors of titanium tetrachloride to film the surface, discontinuing said exposure before a noticeable color appears in the film, bringing the temperature of the article to substantially the point of softening of the glass, and then suddenly chilling said article.

8. The method of increasing the light reflecting properties of a transparent colorless glass surface without materially reducing its efficiency, comprising heating said surface, exposing the heated surface to the vapors of titanium tetrachloride, and discontinuing said exposure before a noticeable color appears on the filmed surface.

9. As a new article of manufacture, a transparent substantially colorless high reflecting film of titanium dioxide on a surface.

10. As a new article of manufacture, a transparent colorless non-wettable film of washed and dried titanium dioxide on a surface.

11. As a new article of manufacture, a stable tightly adherent transparent substantially colorless high reflecting film of titanium dioxide on a surface.

12. As a new article of manufacture, a non-glare mirror comprising a glass plate having an opaque rear surface and a transparent, substantially colorless film of titanium dioxide showing light reflection characteristics between 10% and 35% on its front surface.

13. As a new article of manufacture, a light polarizing non-glare mirror comprising a plate of black glass having a substantially colorless film of titanium dioxide on one face.

14. As a new article of manufacture, a one-way or transparent mirror comprising a transparent plate and a transparent, substantially colorless film of titanium dioxide showing light reflection characteristics between 10% and 35% on at least one surface of said plate.

15. As a new article of manufacture, a transparent substantially colorless film of titanium dioxide showing light reflection characteristics between 10% and 35% at 45° incidence and from 65% to 90% transmission of light at normal incidence on a surface.

ROMEY A. GAISER.

REFERENCES CITED

The following references are of record in the file of this patent:

UNITED STATES PATENTS

| Number | Name | Date |
|---|---|---|
| 207,077 | Shirley | Aug. 13, 1878 |
| 728,063 | Wilson | May 12, 1903 |
| 1,008,902 | Haehnel | Nov. 14, 1911 |
| 1,513,769 | Sullivan | Nov. 4, 1924 |
| 1,603,936 | Colbert | Oct. 19, 1926 |
| 1,698,307 | La Hodny | June 8, 1929 |
| 1,964,322 | Hyde | June 26, 1934 |
| 2,026,086 | Farncomb | Dec. 31, 1935 |
| 2,118,795 | Littleton | May 24, 1938 |
| 2,194,611 | Paddock et al. | Mar. 26, 1940 |
| 2,207,656 | Cartwright et al. | July 9, 1940 |
| 2,239,452 | Williams et al. | Apr. 22, 1941 |
| 2,390,424 | Colbert | Dec. 4, 1945 |

FOREIGN PATENTS

| Number | Country | Date |
|---|---|---|
| 204,627 | Great Britain | Oct. 4, 1923 |
| 384,883 | Great Britain | Dec. 15, 1932 |

OTHER REFERENCES

Pfund (Pub.) Highly Reflecting Films of Zinc Sulphide, Journal of the Optical Soc. of Amer., vol. 24, Apr. 1934, No. 4, pgs. 99–102 inc.

Cartwright et al. (Pub.), Bull. Am. Phy. Soc., vol. 14, #2, Apr. 1939, page 24.

Cartwright et al. (Pub.), Multilayer Films of High Reflecting Power, Physical Review of June 1939, pg. 1128, article 92.